United States Patent
Trofimov et al.

(10) Patent No.: US 12,122,375 B2
(45) Date of Patent: Oct. 22, 2024

(54) METHOD FOR OPERATING A MOTOR VEHICLE, CONTROL UNIT, MOTOR VEHICLE

(71) Applicant: Robert Bosch GmbH, Stuttgart (DE)

(72) Inventors: Alexander Trofimov, Ludwigsburg (DE); Franz Dahlke, Karlsruhe (DE)

(73) Assignee: ROBERT BOSCH GMBH, Stuttgart (DE)

( * ) Notice: Subject to any disclaimer, the term of this patent is extended or adjusted under 35 U.S.C. 154(b) by 563 days.

(21) Appl. No.: 17/264,142

(22) PCT Filed: Aug. 1, 2019

(86) PCT No.: PCT/EP2019/070846
§ 371 (c)(1),
(2) Date: Jan. 28, 2021

(87) PCT Pub. No.: WO2020/048695
PCT Pub. Date: Mar. 12, 2020

(65) Prior Publication Data
US 2021/0354693 A1 Nov. 18, 2021

(30) Foreign Application Priority Data
Sep. 4, 2018 (DE) .......................... 102018214953.4

(51) Int. Cl.
*B60W 30/14* (2006.01)
*B60L 15/20* (2006.01)
(Continued)

(52) U.S. Cl.
CPC ............ *B60W 30/14* (2013.01); *B60L 15/20* (2013.01); *B60T 13/586* (2013.01); *B60W 10/08* (2013.01);
(Continued)

(58) Field of Classification Search
None
See application file for complete search history.

(56) References Cited

U.S. PATENT DOCUMENTS

| 2005/0200197 A1 | 9/2005 | Crombez et al. |
| 2010/0076657 A1* | 3/2010 | Jinno ..................... B60K 6/445 |
| | | 180/65.265 |

(Continued)

FOREIGN PATENT DOCUMENTS

| CN | 103857571 A | 6/2014 |
| DE | 102011085901 A1 | 5/2013 |

(Continued)

OTHER PUBLICATIONS

International Search Report for PCT/EP2019/070846, Issued Nov. 13, 2019.

*Primary Examiner* — Todd Melton
*Assistant Examiner* — Jason R Roberson
(74) *Attorney, Agent, or Firm* — NORTON ROSE FULBRIGHT US LLP; Gerard A. Messina

(57) ABSTRACT

A method for operating a motor vehicle, which includes a drive system, including an electric drive machine, a friction braking system and an actuating element. The actuating element is continuously movable between a first end state and a second end state, a position of the actuating element in the first end state corresponding to a percentage value of 0%, and the position of the actuating element in the second end state corresponding to a percentage value of 100%. An acceleration torque for the motor vehicle is predefined if the positon has a percentage value that is greater than a predefined threshold value, and a deceleration torque for the motor vehicle being predefined if the position has a percentage value that is less than the threshold value. The friction braking system is activated in such a way that the friction (Continued)

braking system generates at least partially the predefined deceleration torque.

10 Claims, 2 Drawing Sheets

(51) Int. Cl.
*B60T 13/58* (2006.01)
*B60W 10/08* (2006.01)
*B60W 10/18* (2012.01)

(52) U.S. Cl.
CPC .......... *B60W 10/18* (2013.01); *B60L 2240/12* (2013.01); *B60L 2240/423* (2013.01); *B60T 2220/04* (2013.01); *B60T 2250/04* (2013.01); *B60T 2270/604* (2013.01); *B60W 2520/00* (2013.01)

(56) References Cited

U.S. PATENT DOCUMENTS

| | | | |
|---|---|---|---|
| 2011/0303498 A1* | 12/2011 | Crombez | B60L 15/2009 188/106 P |
| 2013/0178332 A1 | 7/2013 | Kazama et al. | |
| 2016/0264003 A1* | 9/2016 | Yokoyama | B60L 15/2009 |
| 2018/0244158 A1* | 8/2018 | Komatsu | B60W 10/18 |
| 2018/0334038 A1* | 11/2018 | Zhao | B60W 30/16 |

FOREIGN PATENT DOCUMENTS

| | | |
|---|---|---|
| EP | 1817194 A1 | 8/2007 |
| EP | 1990231 A1 | 11/2008 |
| EP | 3342625 A1 | 7/2018 |
| JP | H08223704 A | 8/1996 |
| JP | 2016220448 A | 12/2016 |
| JP | 201787799 A | 5/2017 |
| WO | 2006054149 A1 | 5/2006 |
| WO | 2018139375 A1 | 8/2018 |

* cited by examiner

METHOD FOR OPERATING A MOTOR VEHICLE, CONTROL UNIT, MOTOR VEHICLE

The present invention relates to a method for operating a motor vehicle, which includes a drive system including an electric drive machine, a friction braking system, in particular, a hydraulic friction braking system, and an actuating element. The actuating element is, in particular, continuously movable between a first end state and a second end state, a position of the actuating element in the first end state corresponding to a percentage value of 0% and the position of the actuating element in a second end state corresponding to a percentage value of 100%. An acceleration torque is predefined for the motor vehicle if the position of the actuating element has a percentage value that is greater than a predefined threshold value. A deceleration torque is predefined for the motor vehicle if the position of the actuating element has a percentage value that is less than the threshold value.

The present invention further relates to a control unit for carrying out the aforementioned method.

The present invention also relates to a motor vehicle including the aforementioned control unit.

BACKGROUND INFORMATION

Methods and motor vehicles generally of the type mentioned above are described in the related art. In order to ensure a safe deceleration of motor vehicles, the latter usually include a friction braking system. In addition, hybrid vehicles and electric vehicles each include a drive system that includes at least one electric drive machine. Hybrid vehicles and electric vehicle also increasingly include actuating elements, for example, accelerator pedals, which have a so-called one-pedal function. Such actuating elements are usually movable between a first end state and a second end state, a position of the actuating elements in the first end state corresponding to a percentage value of 0%, and the position of the actuating elements in the second end state corresponding to a percentage value of 100%. In the case of an actuating element having a one-pedal function, an acceleration torque is predefined for the motor vehicle if the position of the actuating element has a percentage value that is greater than a predefined threshold value, and a deceleration torque if the position of the actuating element has a percentage value that is less than the predefined threshold value.

SUMMARY

A method according to an example embodiment of the present invention may have the advantage that a sufficient deceleration torque for decelerating the motor vehicle is able to be provided by the method, even at low relative speeds of the motor vehicle to ground. According to an example embodiment of the present invention, it is provided that the friction braking system is activated to generate the deceleration torque in such a way that the friction braking system generates the predefined deceleration torque at least partially, in particular, completely. Thus, the friction braking system generates the predefined deceleration torque either alone or in combination with at least one other device of the motor vehicle that is designed to generate a deceleration torque.

According to one preferred specific embodiment of the present invention, it is provided that the electric drive machine of the drive system is operated as a generator to generate the deceleration torque in such a way that the drive machine generates at least partially the predefined deceleration torque. This yields the advantage that by operating the electric drive machine as a generator, braking energy is recovered in the form of electrical energy, as a result of which it is possible to increase the degree of efficiency of the motor vehicle. This also yields the advantage that the friction braking system is relieved, thereby reducing wear on the friction braking system. For example, the friction braking system is activated for generating the deceleration torque preferably only if it is not possible to ensure the predefined deceleration torque solely by operating the electric drive machine as a generator, for example, due to a low relative speed of the motor vehicle.

A relative speed of the motor vehicle to ground, in particular, the relative speed of the vehicle body of the motor vehicle to ground is preferably detected and the predefined deceleration torque is changed as a function of the detected relative speed. This yields the advantage that a deceleration process of the motor vehicle is individually adaptable. For example, a comfort-oriented deceleration of the motor vehicle is implementable as a result. For example, the predefined deceleration torque is changed if it is detected that a predefinable relative speed is exceeded or is undershot. In this case, multiple relative speeds, in particular, are predefined where, when they are exceeded or undershot, the deceleration torque is changed. The deceleration torque is, in particular, continuously changed with the relative speed. If, in addition to the friction braking system, at least one further device, for example, the electric drive machine, is activated to generate the deceleration torque, the percentage portion of the deceleration torque generated by the friction braking system or by the at least one further device, is preferably changed as a function of the relative speed. For example, the percentage portion generated by the friction braking system is increased with a reduction of the relative speed.

According to one preferred specific embodiment of the present invention, it is provided that the deceleration torque is reduced with a reduction of the relative speed. As a result, excessive pitch movements of the motor vehicle or a deceleration jerk during the deceleration of the motor vehicle perceived to be annoying may be avoided so that comfortable deceleration or a comfortable stopping (soft-stop) of the motor vehicle is ensured.

In this case, it is preferably provided that a first threshold speed is predefined, the deceleration torque being reduced only if the detected relative speed is less than the first threshold speed. Accordingly, the deceleration torque is not reduced at least if it is in fact detected that the relative speed is reduced, but the relative speed is greater than the first threshold speed. This ensures that a rapid deceleration of the motor vehicle is achieved at relative speeds of the motor vehicle that are greater than the first threshold speed.

According to one preferred specific embodiment of the present invention, it is provided that a second threshold speed is predefined, which is greater than the first threshold speed, the deceleration torque being increased with the reduction of the relative speed if a relative speed is detected, which is greater than the first threshold speed and less than the second threshold speed. By predefining the deceleration torque in this way, a particularly rapid yet still comfortable deceleration or stopping (positive soft-stop) of the motor vehicle is achieved.

The deceleration torque is preferably predefined as a function of a previously stored characteristic curve. The characteristic curve is, in particular, a characteristic curve ascertained in preliminary tests, which represents the deceleration torque predefined or to be predefined as a function of the detected relative speed of the motor vehicle. This yields the advantage that a multitude of relative speeds of the motor vehicle may each be assigned a suitable deceleration torque for achieving a comfortable deceleration or stop.

The characteristic curve in this case preferably exhibits a slope, which becomes greater and/or smaller with decreasing relative speed. This yields the advantage that a deceleration process or stopping process of the motor vehicle is individually adaptable. For example, characteristic curves having different slopes and/or slope changes are used as a function of a selected driving mode and/or as a function of the design of the motor vehicle in which the method is carried out.

The motor vehicle is preferably decelerated to a standstill by the predefined deceleration torque. The method is particularly advantageously suited for this purpose because a braking torque, sufficient enough to decelerate the motor vehicle to a standstill or to hold the motor vehicle at a standstill, is still able to be generated by the friction braking system, even at low relative speeds of the motor vehicle or with the motor vehicle at a standstill.

According to one preferred specific embodiment of the present invention, it is provided that a minimum value for the Substitute Specification deceleration torque is predefined, the deceleration torque not being reduced below the minimum value. This ensures on the one hand that a sufficient deceleration torque is predefined for the deceleration of the motor vehicle, in particular, for the deceleration of the motor vehicle to a standstill. On the other hand, it is also ensured that the motor vehicle, once it reaches a standstill, is held at a standstill. Because no generator-induced deceleration torque is able to be generated by the electric drive machine with the motor vehicle at a standstill, preferably only the friction braking system is activated to hold the motor vehicle.

According to one preferred specific embodiment of the present invention, it is provided that a base deceleration torque is generated by the friction braking system, a difference between the base deceleration torque and the predefined deceleration torque being essentially compensated for by operating the electric drive machine as a motor or as a generator. Accordingly, a base deceleration torque is generated by the friction braking system, which differs from the predefined deceleration torque, i.e., which is greater than or less than the predefined deceleration torque. In order to at least essentially compensate, in particular, fully compensate for the difference between the base deceleration torque and the predefined deceleration torque, a compensation torque is generated by the electric machine. For this purpose, the electric machine is motor-operated if the base deceleration torque is greater than the predefined deceleration torque, and generator-operated if the base deceleration torque is less than the predefined deceleration torque. A particularly precise and rapid control of the deceleration torque is achieved as a result. The base deceleration torque is, in particular, held constant with a change of the relative speed, so that the predefined change of the deceleration torque is achieved only as the result of a change of the compensation torque.

A control unit according to an example embodiment of the present invention for a motor vehicle as described above, when used as intended, is configured to carry out the example method(s) according to the present invention. This yields the above-cited advantages. Further preferred features and feature combinations result from the description herein and from the figures.

A motor vehicle according to an example embodiment of the present invention includes a drive system including an electric drive machine, a friction braking system, an actuating element, which is, in particular, continuously movable between a first end state and a second end state, a position of the actuating element in the first end state corresponding to a percentage value of 0% and the position of the actuating element in the second end state corresponding to a percentage value of 100%, and the control unit according to the present invention. This also yields the above-cited advantages. Further preferred features and feature combinations result from the description herein and from the figures.

BRIEF DESCRIPTION OF THE DRAWINGS

The present invention is explained in greater detail below with reference to the figures.

DETAILED DESCRIPTION OF EXAMPLE EMBODIMENTS

Figure 1:
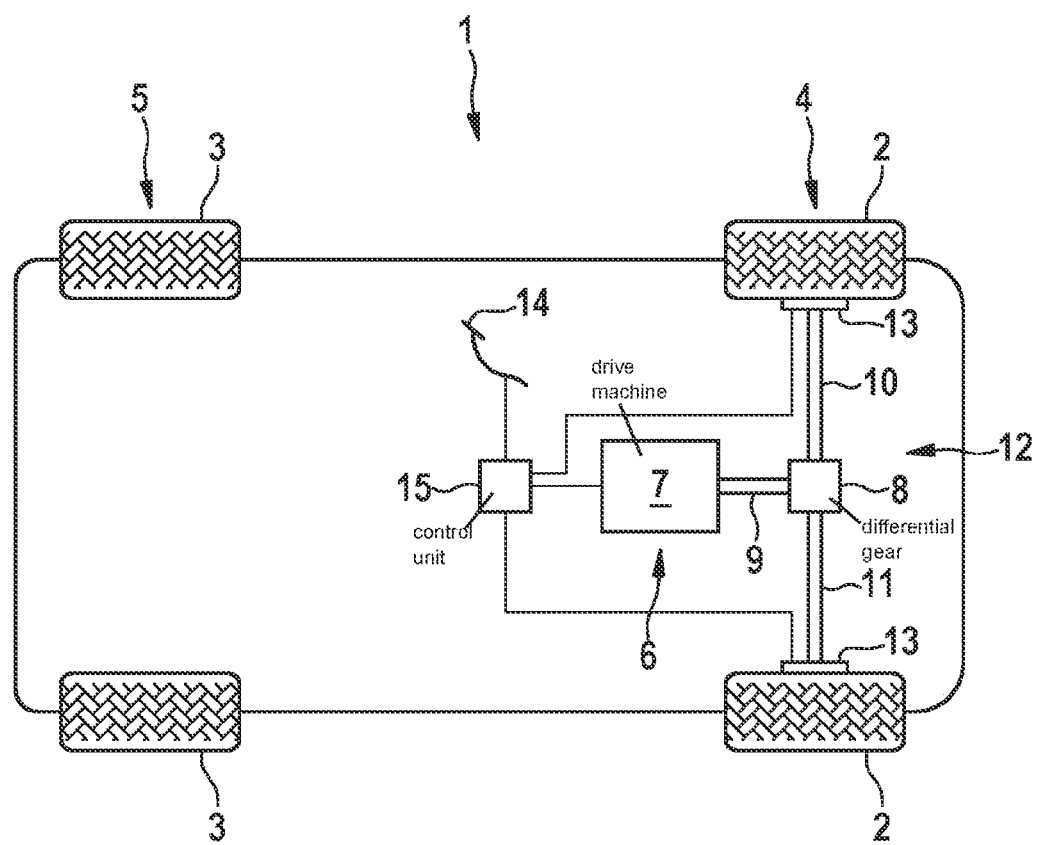
FIG. 1 shows a simplified representation of a motor vehicle in accordance with an example embodiment of the present invention.

FIG. 1 shows a simplified representation of a motor vehicle 1. Motor vehicle 1 in the present case includes four wheels 2 and 3, wheels 2 being assigned to a front wheel axle 4 and wheels 3 being assigned to a rear wheel axle 5. Motor vehicle 1 also includes a drive system 6 including an electric drive machine 7 operable as a generator. Drive machine 7 is connected to wheels 2 of front wheel axle 4 by a differential gear 8 and shafts 9, 10 and 11 in such a way that wheels 2 are driveable by drive machine 7. Motor vehicle 1 also includes a friction braking system 12 which, in the present case, includes friction braking units 13 assigned to front wheel axle 4 for generating a deceleration torque MV. Friction braking units 13 in the present case are hydraulically actuatable. Alternatively, friction braking system 12 includes electromotively or pneumatically actuable friction braking units 13.

Motor vehicle 1 depicted in FIG. 1 includes an actuating element 14, which is designed as an accelerator pedal, and which is continuously movable between a first end state and a second end state, the position of actuating element 14 in the first end state corresponding to a percentage value of 0% and the position of actuating element 14 in the second end state corresponding to a percentage value of 100%. With the aid of actuating element 14, it is possible to selectively predefine either an acceleration torque or a deceleration torque MV for motor vehicle 1. In the process, an acceleration torque is predefined if the position of the actuating element 14 has a percentage value that is greater than a predefined threshold value, and a deceleration torque MV if the position of control element 14 has a percentage value that is less than the predefined threshold value.

To predefine the acceleration torque or deceleration torque MV, motor vehicle 1 includes a control unit 15, which is connected on the one hand to actuating element 14 and on the other hand to drive machine 7 and to friction braking units 13. If an acceleration torque is predefined based on the position of the actuating element 14, control unit 15 activates drive machine 7 to generate the acceleration torque. If a deceleration torque MV is predefined, control unit 14 activates at least friction braking units 13 to generate deceleration torque MV. Control unit 15 optionally also activates drive machine 7 to generate a generator-induced deceleration torque MV.

Figure 2:
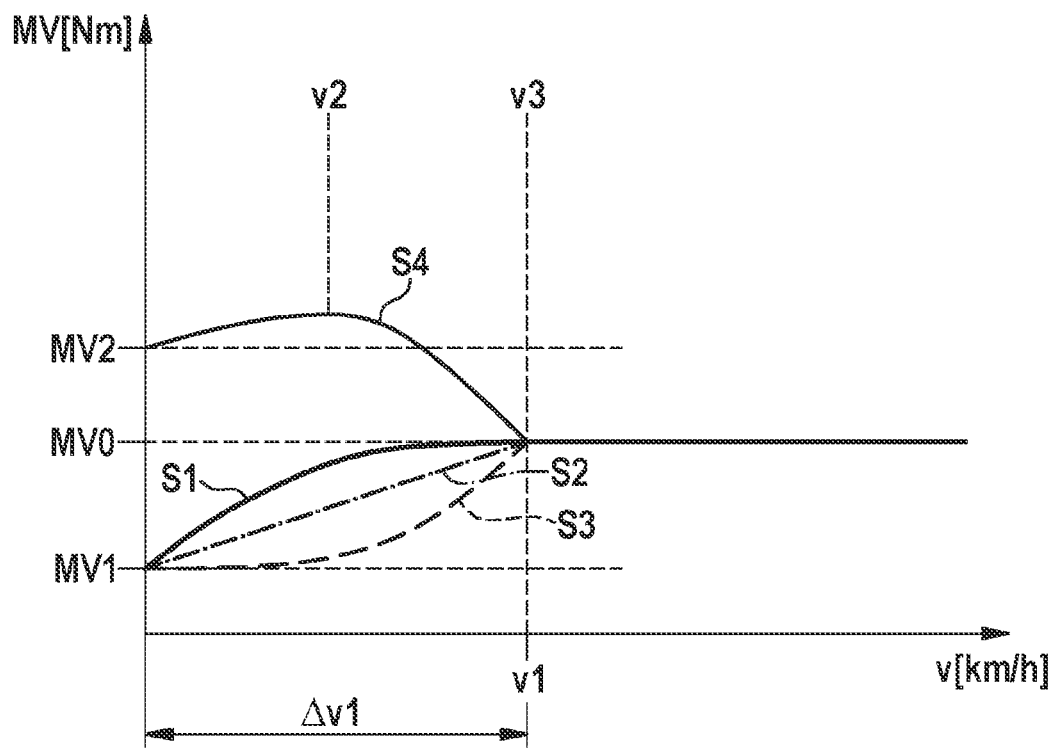
FIG. 2 shows an overview of characteristic curves of various advantageous stopping strategies for the motor vehicle, in accordance with an example embodiment of the present invention.

FIG. 2 shows characteristic curves S1, S2, S3, and S4, of various advantageous deceleration processes for motor vehicle 1. For this purpose, deceleration torque MV, which is predefined by control unit 15 for motor vehicle 1 if the position of actuating element 14 has a percentage value that is less than the threshold value, is represented as a function of a relative speed v of motor vehicle 1. As is apparent from FIG. 2, deceleration torque MV is changed as a function of relative speed v.

According to characteristic curves S1, S2 and S3, predefined deceleration torque MV is held constant at a value MV0 with a reduction of relative speed v of motor vehicle 1 if relative speed v is greater than a predefined threshold speed v1. If detected relative speed v is less than threshold speed v1, deceleration torque MV is reduced with relative speed v. By reducing deceleration torque MV, a particularly comfortable deceleration of motor vehicle 1, in particular, to a standstill of motor vehicle 1, is achieved. A deceleration jerk as motor vehicle 1 is being stopped is, in particular, avoided. As is apparent from FIG. 2, the deceleration torque is not reduced below a predefined minimum value MV1. This ensures that motor vehicle 1, after being decelerated to a standstill, is held at a standstill. Characteristic curves S1, S2 and S3 differ from one another insofar as they each exhibit different slopes or slope changes in a relative speed range Δv1 with decreasing relative speed. According to characteristic curve S2, deceleration torque MV is reduced linearly at relative speed v. By contrast, the slope of characteristic curve S1 becomes greater with decreasing speed v and the slope of characteristic curve S3 becomes smaller with decreasing relative speed v.

Characteristic curve S4 depicted in FIG. 2 differs from characteristic curves S1, S2 and S3 insofar as in addition to a first threshold speed v2, by which deceleration torque MV is reduced with a reduction of relative speed v if relative speed v is less than first threshold speed v2, a second threshold speed v3 is also predefined, which is greater than first threshold speed v2, and deceleration torque MV being increased with the reduction of relative speed v if a relative speed v is detected, which is greater than first threshold speed v2 and less than second threshold speed v3. By predefining deceleration torque MV in such a way, a particularly rapid but still comfortable deceleration or stopping of motor vehicle 1 is achieved. A Substitute Specification minimum value MV2 for deceleration torque MV is also predefined according to characteristic curve S4, below which deceleration torque MV is not reduced.

According to FIG. 2, first threshold speed v1 of characteristic curves S1, S2 and S3 corresponds to second threshold speed v3 of characteristic curve S4. The position of threshold speeds v1, v2 and v3 is, however, represented merely as an example in FIG. 2. According to further exemplary embodiments of characteristic curves S1, S2, S3, and S4, first threshold speed v1 of characteristic curves S1, S2 and S3 differs from second threshold speed v3 of characteristic curve S4.

Figure 3:
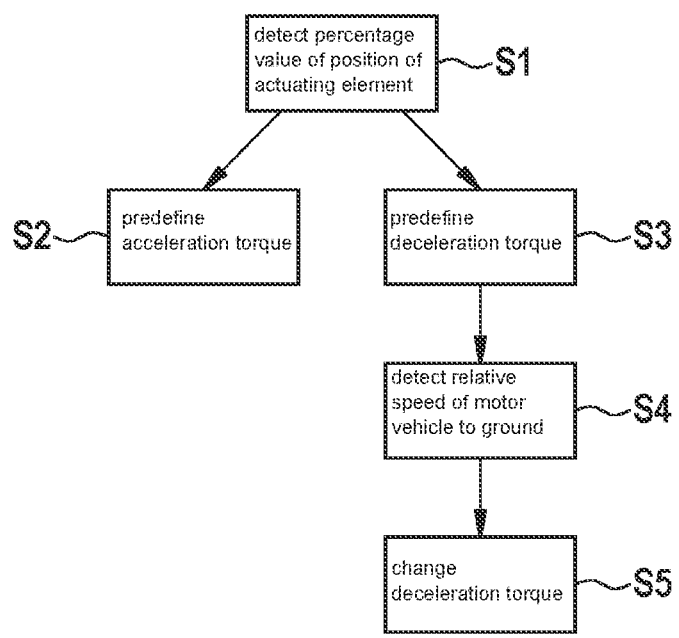
FIG. 3 shows one advantageous method for operating the motor vehicle, in accordance with an example embodiment of the present invention.

FIG. 3 shows one advantageous method for operating motor vehicle 1. In a first step S1, the percentage value of the position of actuating element 14 is detected. In a subsequent step S2, an acceleration torque for motor vehicle 1 is predefined if it is detected in first step S1 that the percentage value of the position of actuating element 14 is greater than the predefined threshold value.

If, however, it is detected in first step S1 that the position of actuating element 14 has a percentage value that is less than the threshold value, a deceleration torque MV for motor vehicle 1 is then predefined in a step S3 instead of an acceleration torque in step S2. Predefined deceleration torque MV in this case is generated at least by friction braking units 13 of motor vehicle 1. In addition, drive machine 7 is optionally also operated as a generator for generating deceleration torque MV.

In a subsequent step S4, a relative speed v of motor vehicle 1 to ground is detected. In the present case, the relative speed of the vehicle body of motor vehicle 1 to ground is detected as relative speed v.

In a subsequent step S5, deceleration torque MV predefined for motor vehicle 1 based on the percentage value of the position of actuating element 14, which is less than the threshold value, is changed as a function of detected relative speed v. For example, predefined deceleration torque MV is changed according to one of characteristic curves S1, S2, S3, and S4 depicted in FIG. 2.

This results in each case in a particularly comfortable deceleration process with motor vehicle 1. In order to ensure the change of deceleration torque MV, deceleration torque MV generated by friction braking units 13, generator-induced deceleration torque MV generated by drive machine 7 or deceleration torque MV generated both by friction braking units 13 and by drive machine 7 are changed.

Because friction braking units 13 are activated for generating deceleration torque MV, motor vehicle 1 is able to be decelerated to a standstill. Motor vehicle 1 may also be held at a standstill by activating friction braking units 13.

What is claimed is:

1. A method for operating a motor vehicle, which includes a drive system including an electric drive machine, a friction braking system, and an actuating element, the actuating element being continuously movable between a first end state and a second end state, a position of the actuating element in the first end state corresponding to a percentage value of 0%, and the position of the actuating element in the second end state corresponding to a percentage value of 100%, the method comprising the following steps:
   predefining an acceleration torque for the motor vehicle when the position of the actuating element has a percentage value that is greater than a predefined threshold value;
   predefining a deceleration torque for the motor vehicle when the position of the actuating element has a percentage value that is less than the threshold value; and
   activating the friction braking system in such a way that the friction braking system generates, at least partially, the predefined deceleration torque, wherein:
   a relative speed of the motor vehicle to ground is detected, and the predefined deceleration torque is changed as a function of the detected relative speed,
   the predefined deceleration torque is reduced with a reduction of the relative speed,
   a first threshold speed is predefined, the predefined deceleration torque being reduced only when the detected relative speed is less than the first threshold speed, and
   a second threshold speed is predefined, which is greater than the first threshold speed, the predefined deceleration torque being increased with the reduction of the relative speed when a relative speed is detected, which is greater than the first threshold speed and less than the second threshold speed.

2. The method as recited in claim 1, wherein the friction braking system is a hydraulic friction braking system, and wherein, in the activating step, the friction braking system generates completely the predefined deceleration torque.

3. The method as recited in claim 1, wherein the electric drive machine of the drive system is operated as a generator for generating the predefined deceleration torque in such a way that the drive machine generates at least partially the predefined deceleration torque.

4. The method as recited in claim 1, wherein the deceleration torque is predefined as a function of a previously stored characteristic curve.

5. The method as recited in claim 4, wherein the characteristic curve exhibits a slope, which becomes greater and/or smaller with decreasing relative speed.

6. The method as recited in claim 1, wherein the motor vehicle is decelerated to a standstill by the predefined deceleration torque.

7. The method as recited in claim 1, wherein a minimum value is predefined for the deceleration torque.

8. The method as recited in claim 1, wherein a base deceleration torque is generated by the friction braking system, a difference between the base deceleration torque and the predefined deceleration torque being compensated for by operating the electric drive machine as a motor or as a generator.

9. A control unit for a motor vehicle, the motor vehicle including a drive system including an electric drive machine, a friction braking system, and an actuating element, the actuating element being continuously movable between a first end state and a second end state, a position of the actuating element in the first end state corresponding to a percentage value of 0%, and the position of the actuating element in the second end state corresponding to a percentage value of 100%, wherein the control unit is configured to operate the motor vehicle, the control unit being configured to:
  predefine an acceleration torque for the motor vehicle when the position of the actuating element has a percentage value that is greater than a predefined threshold value;
  predefine a deceleration torque for the motor vehicle when the position of the actuating element has a percentage value that is less than the threshold value; and
  activate the friction braking system in such a way that the friction braking system generates, at least partially, the predefined deceleration torque, wherein:
    a relative speed of the motor vehicle to ground is detected, and the predefined deceleration torque is changed as a function of the detected relative speed,
    the predefined deceleration torque is reduced with a reduction of the relative speed,
    a first threshold speed is predefined, the predefined deceleration torque being reduced only when the detected relative speed is less than the first threshold speed, and
    a second threshold speed is predefined, which is greater than the first threshold speed, the predefined deceleration torque being increased with the reduction of the relative speed when a relative speed is detected, which is greater than the first threshold speed and less than the second threshold speed.

10. A motor vehicle, comprising:
  a drive system which includes an electric drive machine, a friction braking system, and an actuating element, the actuating element being continuously movable between a first end state and a second end state, a position of the actuating element in the first end state corresponding to a percentage value of 0%, and the position of the actuating element in the second end state corresponding to a percentage value of 100%; and
  a control unit configured to operate the motor vehicle, the control unit being configured to:
    predefine an acceleration torque for the motor vehicle when the position of the actuating element has a percentage value that is greater than a predefined threshold value,
    predefine a deceleration torque for the motor vehicle when the position of the actuating element has a percentage value that is less than the threshold value, and
    activate the friction braking system in such a way that the friction braking system generates, at least partially, the predefined deceleration torque, wherein:
      a relative speed of the motor vehicle to ground is detected, and the predefined deceleration torque is changed as a function of the detected relative speed,
      the predefined deceleration torque is reduced with a reduction of the relative speed,
      a first threshold speed is predefined, the predefined deceleration torque being reduced only when the detected relative speed is less than the first threshold speed, and
      a second threshold speed is predefined, which is greater than the first threshold speed, the predefined deceleration torque being increased with the reduction of the relative speed when a relative speed is detected, which is greater than the first threshold speed and less than the second threshold speed.

* * * * *